United States Patent [19]
Ouchi

[11] Patent Number: 4,740,994
[45] Date of Patent: Apr. 26, 1988

[54] METHOD AND CIRCUIT FOR SUPPRESSING SEQUENTIAL "ZEROES" DATA

[75] Inventor: Noriaki Ouchi, Kawasaki, Japan

[73] Assignee: Fujitsu Limited, Kawasaki, Japan

[21] Appl. No.: 863,004

[22] Filed: May 14, 1986

[30] Foreign Application Priority Data

May 17, 1985 [JP] Japan ................................ 60-104047

[51] Int. Cl.⁴ ............................................. H04L 27/00
[52] U.S. Cl. ...................................... 375/37; 358/260; 455/608
[58] Field of Search ....................... 375/17, 22, 57, 37; 455/608; 358/260, 261; 360/45

[56] References Cited

U.S. PATENT DOCUMENTS

| | | | |
|---|---|---|---|
| 4,027,152 | 5/1977 | Brown et al. | 375/17 |
| 4,262,309 | 4/1981 | Yamaguchi et al. | 358/260 |
| 4,347,617 | 8/1982 | Murano et al. | 375/22 |
| 4,502,143 | 2/1985 | Kato et al. | 455/608 |

*Primary Examiner*—Robert L. Griffin
*Assistant Examiner*—Stephen Chin
*Attorney, Agent, or Firm*—Staas & Halsey

[57] ABSTRACT

A method and a circuit for suppressing sequential "zeroes" data comprising, a transmitting portion and a receiving portion. The transmitting portion of the circuit provides a device for detecting whether zeroes data is sequenced in a frame, inserting the datum "1" after the sequential zeroes data when sequential zeroes data is detected, sending the frame having the datum "1" to the receiving portion and adding a portion of the frame, which is forced out by the insertion of the datum "1", to the top portion of the next frame. This forced out portion is used for detecting sequential zeroes data in the next frame. The receiving portion of the circuit detects whether the datum "1" has been inserted because sequential zeroes data are present in the frame received, and deletes the datum "1" from the received frame.

7 Claims, 10 Drawing Sheets

TRANSMISSION FRAME

METHOD AND CIRCUIT FOR SUPPRESSING SEQUENTIAL "ZEROES" DATA

BACKGROUND OF THE INVENTION

1. Field of the Invention

The present invention relates to a method and circuit for suppressing sequential "zeroes" data. More particularly, it relates to a method and circuit for suppressing sequential "zeroes" data by inserting "1" after required sequential "zeroes" data and using a frame forced out by the above insertion of "1" as useful data.

2. Description of the Related Art

Generally, when there are too many sequential "zeroes" in the data transmitted between a transmitter and a receiver, a repeater may fail, because the repeater cannot extract a clock signal.

For this reason, the too many sequential "zeroes" are conventionally suppressed by either scrambling or by detection of the sequential zeroes.

Scrambling, on the transmitter side, suppresses sequential "zeroes" data by adding random data from a random pattern generator to the sequential "zero" data and changing the "zeroes" data into different data, and subsequently, on the receiver side, the same random data are added to the different data received, and the above "zeroes" data is regenerated.

Detection of the sequential zeroes, on the transmitter side, allows suppression of the sequential "zeroes" data by changing the last bit of the required sequential "zeroes" data to "1", and subsequentially, on the receiver side, the received "1" is changed again to "zero". This method will be explained in detail hereinafter.

The present invention is related to an improvement of the method of detecting the above sequential zeroes.

This conventional sequential zeroes detecting method, in actuality, has been realized by converting the "zero" of an LSB (Least Significant Bit) of bandwidth compression coding data in a telephone communication network to "1", which does not have an important effect on the network when compared with the conversion of a "zero" of an MSB (Most Significant Bit). However, on the receiver side in the conventional sequential "zeroes" detecting method, it is impossible to judge whether or not a "1" received has been converted from a "zero" on the transmitter side. If the "1" received is judged to have been converted from a "zero" even if it has not been converted, the receiver treats the received "1" as a "zero".

Consequently, the receiver side produces data which is completely different from the data sent by the transmitter, and this tendency is amplified when the conventional method is used for predictive coding or differential coding of one of many bandwidth compression codings, since error differential codes are stacked.

As can be understood from the above, the conventional sequential zeroes detecting method easily causes a misconversion on the receiver side, and this is not suitable for bandwidth compression coding in a visual communication network.

SUMMARY OF THE INVENTION

An object of the present invention is to provide a method and a circuit for suppressing sequential "zeroes" data suitable for bandwidth compression coding in a visual communication network.

The above-mentioned object can be achieved by a method of inserting a "1" for every m bits of data and adding a frame forced out by this "1" to the top of the next sequential zeroes data, and by a circuit for carrying out the same method when sequential "zeroes" data are detected on the transmission side.

BRIEF DESCRIPTION OF THE DRAWINGS

Further features and advantages of the present invention will be apparent from the ensuring description with reference to the accompanying drawings, wherein:

FIGS. 7a and 7b are explanatory views of the operation of the first memory of FIG. 6a;

FIGS. 8a, 8b, and 8c are explanatory views of the operation of the second memory of FIG. 6a;

DESCRIPTION OF THE PREFERRED EMBODIMENTS

Before describing the preferred embodiments, an explanation of a prior art method and circuit will be given for reference.

Figure 1:
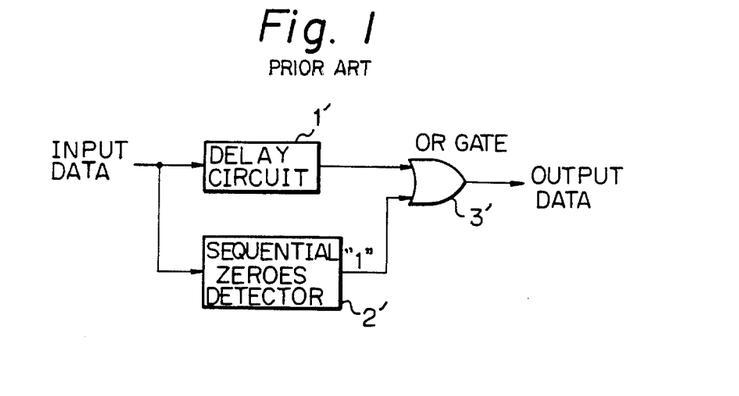
FIGS. 1 and 2a and 2b are explanatory drawings of the conventional method and circuit for suppressing sequential "zeroes" data.

FIG. 1 is a circuit diagram of a conventional transmitting portion.

This circuit consists of a delay circuit 1', a sequential zeroes detector 2', and an OR gate 3'. Data including sequential zeroes is input to the delay circuit 1' and the sequential zeroes detector 2'. When the detector 2' detects sequential zeroes in the input data, it outputs the datum "1" which is input to the OR gate 3' with the sequential zeroes data through the circuit 1'.

Consequently, the data having sequential zeroes are changed to include the datum "1", which is output from the or gate 3' as the output data.

Figure 2A:
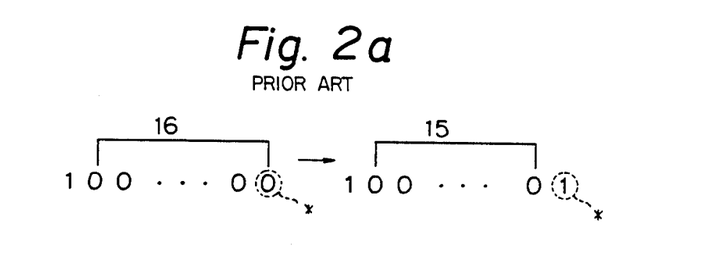
Figure 2B:
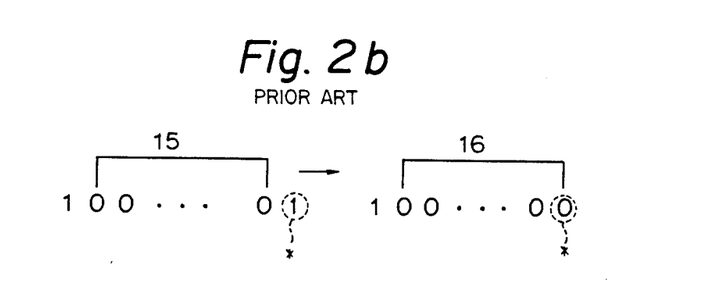

An example is shown in FIGS. 2a and 2b. If 16 zeroes are sequenced after the datum "1" as shown on the left with respect to the arrow of FIG. 2a, the 16th "zero" datum is changed to the datum "1" as shown on the right with respect to the arrow of FIG. 2a (marked with an asterisk).

On the receiving side, if the datum "1" is detected after the 15 sequential zeroes as shown on the left with respect to the arrow of FIG. 2b, this "1" datum is changed to the "zero" datum as shown on the right with respect to the arrow of FIG. 2b (marked with an asterisk).

However, the prior art can not determine whether the datum "1" received in the receiving portion is the datum to be changed back to "zero" as shown in FIG. 2b or is datum not to be changed to "zero", because this "1" is the most significant bit.

Figure 3A:
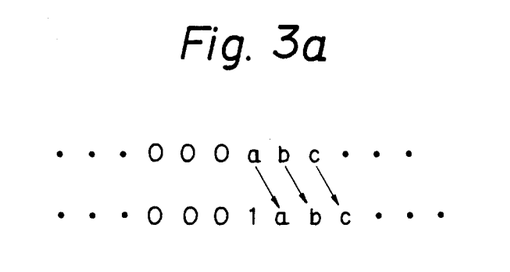
FIGS. 3a and 3b are explanatory drawings of the method in accordance with the present invention.

In accordance with method of the present invention, if 16 zeroes are sequenced followed by the data "a", "b", "c" . . . , as shown in the upper view of FIG. 3a, the datum "1" is "inserted" after the above sequential zeroes and the following data "a", "b", "c" . . . are shifted to be subsequent to the datum "1", as shown in the lower view of FIG. 3a (shown by an arrow).

Figure 3B:
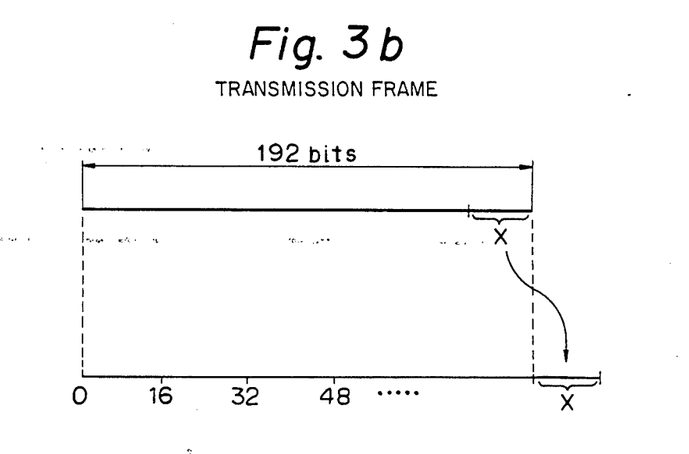

The above method inserts the datum "1" into a transmission frame as shown in FIG. 3b.

That is to say, if the transmission frame of 192 bits has all sequential "zeroes", a total of 12 datum "1" are inserted. The datum "1" is inserted into the 16th bit, 32nd bit, 48th bit, . . . 192th bit. Therefore, data 12 bits in length designated by the reference numeral X is forced out, and this data X is added to the top position of the next transmission frame of 192 bits. Thus, the data X can be used as the valid data for suppressing sequential "zeroes" in accordance with the present invention.

Figure 4:
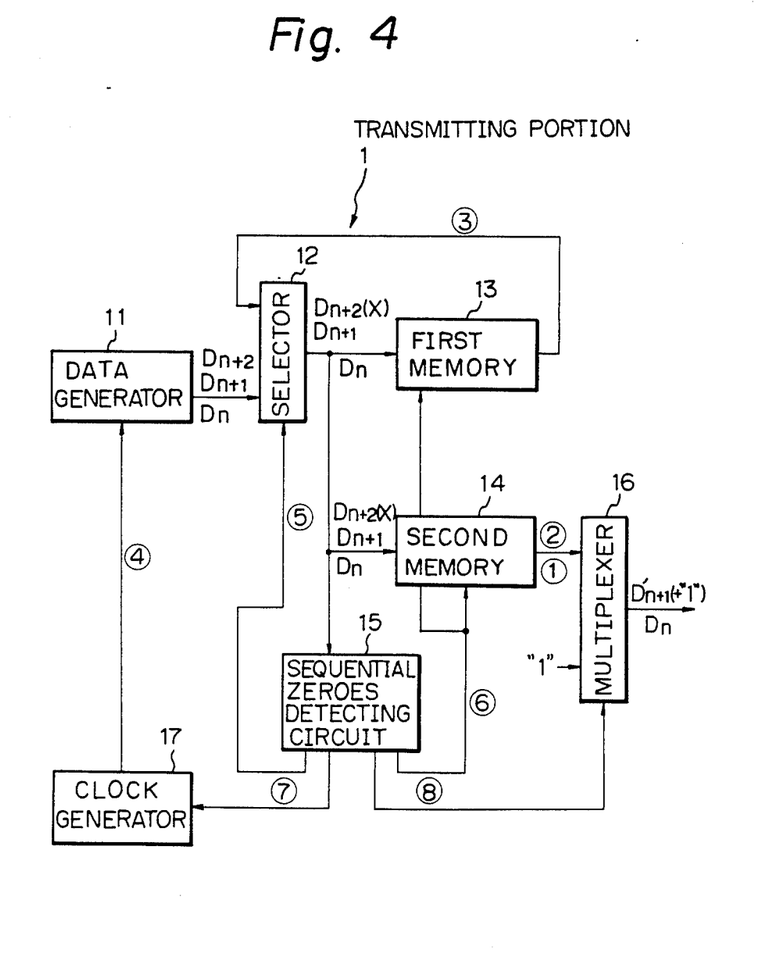
FIG. 4 is a circuit diagram of the transmitting portion of the present invention.

The above-mentioned method is carried out by the circuit of FIG. 4. FIG. 4 refers to a transmitting portion 1 consisting of a data generator 11, selector 12, first memory 13, a second memory 14, sequential zeroes detecting circuit 15, multiplexer 16, and clock generator 17. The data generator 11 produces the transmission frame of 192 bits (shown in FIG. 3b). The selector 12 selects input data from either the data generator 11 or from the first memory 13. Both the first memory 13 and second memory 14 store the transmission frame of 192 bits through the selector 12, but the first memory 13 outputs only the data or frame X, which is forced out as shown in FIG. 3b. The second memory outputs only the transmission frame of 192 bits except for the frame X. The sequential zeroes detecting circuit 15 detects whether sequential zeroes are included in the transmission frame that passes through the selector 12. The multiplexer 16 inserts the datum "1" into the above mentioned portion from the second memory 14 (see FIG. 3b), when sequential zeroes are detected by the circuit 15. The clock generator 17 produces clock pulses to operate the data generator 11.

The operation of FIG. 4 will be explained, according to FIG. 5. At first, the selector 12 is switched to select data from the data generator 11, whereby as initial transmission frame $D_n$ produced by the data generator 11 is input to the memories 13 and 14 and the circuit 15, through the selector 12. The frame $D_n$ is written in the memories 13 and 14, by the circuit 15 (⑥ of FIG. 4). However, because sequential zeroes are not detected in the frame $D_n$, which is also by the circuit 15, the frame $D_n$ written in the second memory 14, is read directly and is input to the multiplexer 16 (① of FIGS. 4 and 5; ⑥ of FIG. 4), which directly outputs the frame $D_n$.

Figure 5:
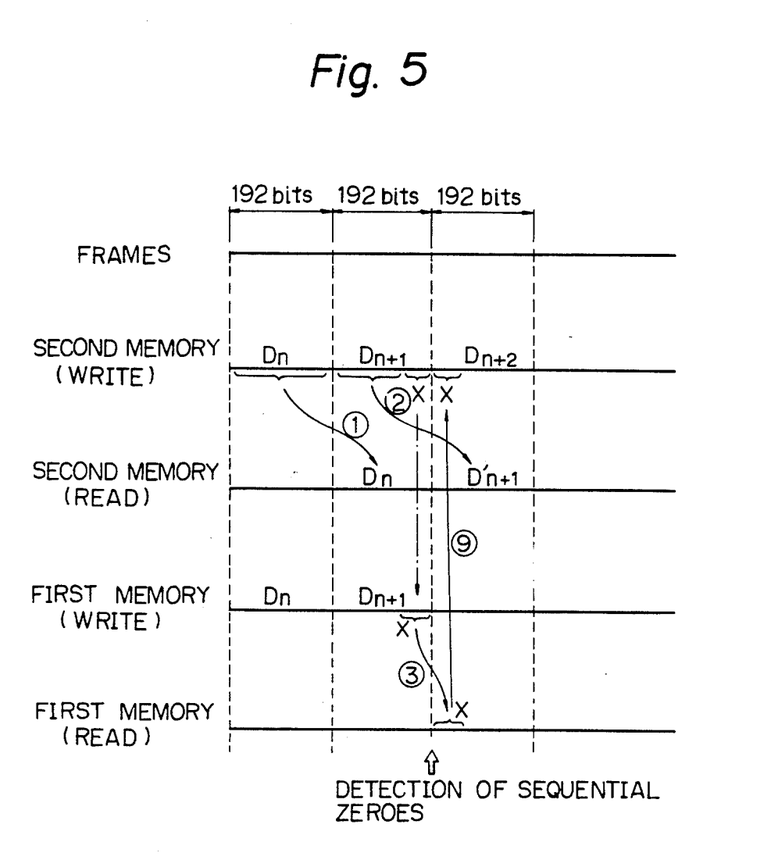
FIG. 5 is an explanatory view of the operation of FIG. 4.

As shown in FIG. 5, the next frame $D_{n+1}$ is already written in the memories 13 and 14, and input to the circuit 15, the frame $D_n$ is read from the second memory 14. As the circuit 15 detects the sequential zeroes in the frame $D_{n+1}$, it prevents the clock generator 17 from producing clock pulses (⑦ of FIG. 4) and switches the selector 12 to select data from the first memory 13 (⑤ of FIG. 4). At the same time, the circuit 15 sends the reading signal (⑥ of FIG. 4) to the memories 13 and 14. Only the portion $D'_{n+1}$, except for the forced out frame X, is read out from the second memory 14, and only the frame X is read out from the first memory 13 (② and ③ of FIGS. 4 and 5). To the portion $D'_{n+1}$ which is read out, the datum "1" is applied per each 16 bits, by the multiplexer 16 which outputs a frame $D'_{n+1}$ (+"1") where the data "1" are inserted. The frame X is input to the second memory 14, and the sequential zeroes detecting circuit 15 and is added to the top of a third frame $D_{n+2}(X)$ (⑨ of FIG. 5), which is used for detecting sequential zeroes. At this time, clock pulses are not produced by the clock generator 17, and thus no frames are output by the data generator 11.

Figure 6A:
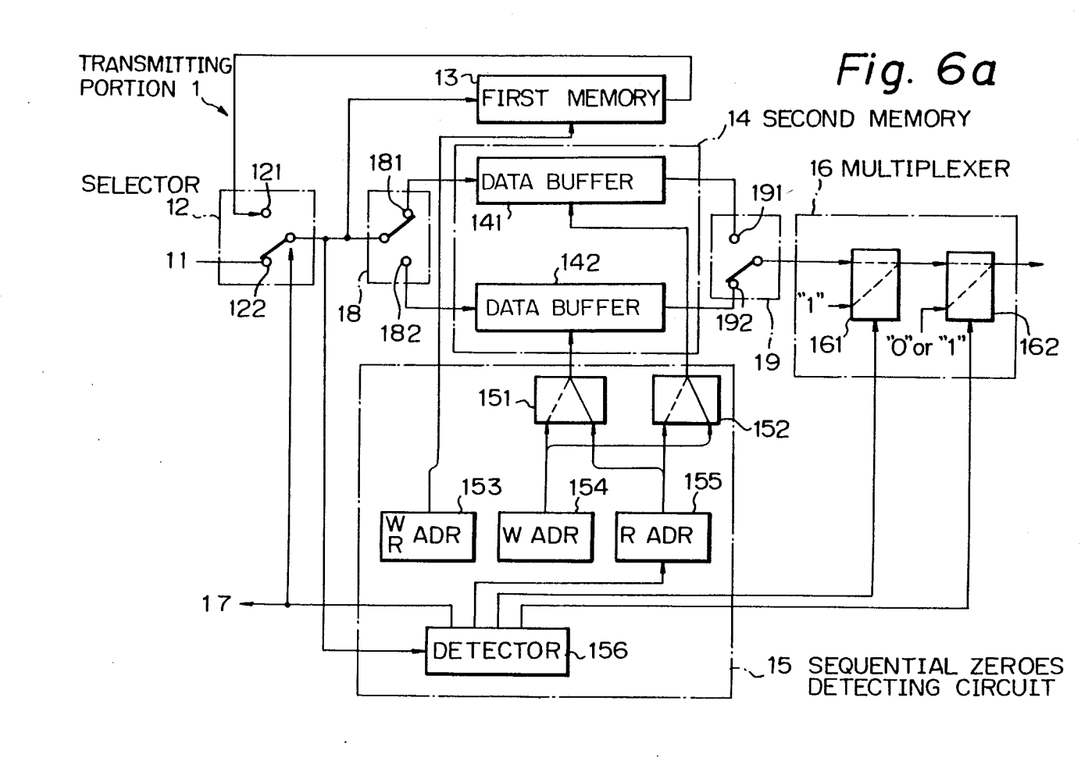
FIG. 6a is a more detailed circuit diagram of FIG. 4.

The circuit diagram of FIG. 4 will be explained in more detail using to FIG. 6a. The reference numeral to each element in FIG. 6a corresponds to that of FIG. 4. Since the details of the data generator 11 and the clock generator 17 in FIG. 4 have been made clear, they are omitted in FIG. 6a. In FIG. 6a, the selector 12 usually has been switched to the connecting point 122, but when sequential zeroes are detected in the frame of the generator 11, the selector 12 is switched to the connecting point 121. The second memory 14 has two buffer memories 141 and 142, which is different from the first memory 13. The buffer memories 141 and 142 constitute a double buffer, that is to say, when one buffer is in the write mode, the other buffer is in the read mode. This operation is carried out by an input selector 18 and an output selector 19.

The sequential zeroes detecting circuit 15 consists of a selector 151, selector 152, a write and read address generator 153, a write address generator 154, a read address generator 155, and a sequential zeroes detector 156. The selector 151 determines whether a write address or a read address is to be input to the buffer memory 142 of the second memory 14. The selector 152 carries out the same operation for the buffer memory 141 of the second memory 14 as the selector 151. The write and read addresses generator 153 generates a write address and a read address for the first memory 13. The write address generator 154 generates a write address for the buffer memories 141 and 142 through the the selectors 152 and 151. The read address generator 155 generates a read address for the buffer memories 141 and 142 through the selectors 152 and 151. The sequential zeroes detector 156 detects whether zeroes are sequenced in the frame through the selector 12.

The multiplexer 16 consists of two selectors 161 and 162. The selector 161 inserts the datum "1" into the frame where zeroes are sequenced. The selector 162 multiplexes a flag signifying whether the datum "1" is inserted by the selector 161.

Figure 6B:
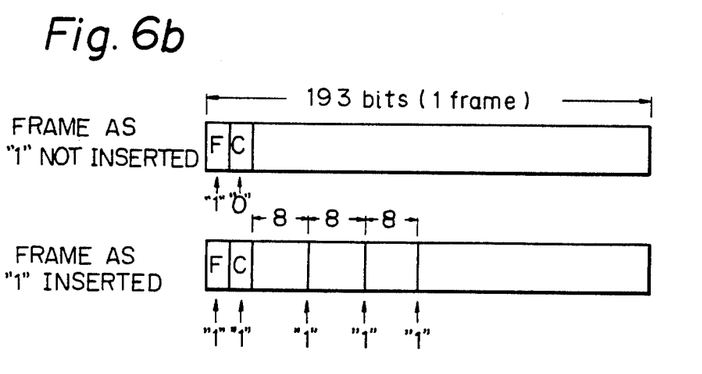
FIG. 6b is a format view of a transmission frame used in the present invention.

The operation of FIG. 6a will be explained, according to FIG. 6b and FIGS. 7a to 8c. FIG. 6b shows the constitution of the frame output in the transmitting portion 1. The frame of FIG. 6b is 193 bits in length, the upper portion shows the frame when the datum "1" is not inserted, and the lower portion shows the frame when the datum "1" is inserted. The reference numerals F and C of both upper and lower views correspond to a frame synchronizing bit and a "1" inserting flag bit, respectively. The F is positioned at the first bit of the frame. However, the C is positioned at the second bit of the frame, and is "0" when "1" is not inserted, as shown in the upper view of FIG. 6b, but is "1" when "1" is inserted per 8 bits, as shown in the lower view of FIG. 6b.

Figure 7A:
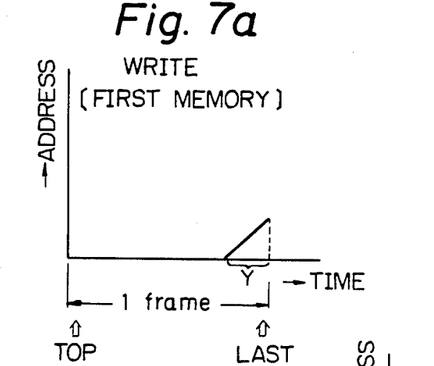
Figure 7B:
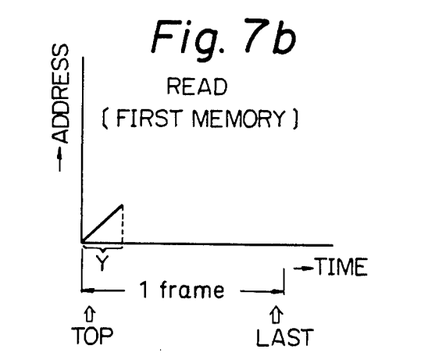
Figure 8A:
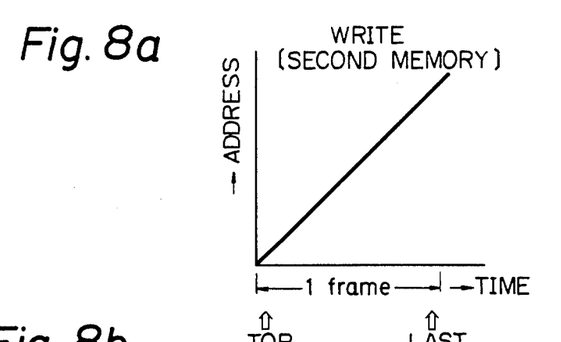

Initially, the selector 12 of FIG. 6a has been switched to the point 122. Therefore, the frame of 193 bits from the generator 11 is input to the sequential zeroes detector 156 through the selector 12. When the detector 156 does not detect sequential zeroes, all data of the frame is written in the buffer memory 141 of the second frame, through the point 181 of the selector 18, according to the write addresses sent from the write address generator 154 through the selector 152, as shown in FIG. 8a. The vertical axis and horizontal axis of FIG. 8a show the address and time, respectively, and moreover, the horizontal axis corresponds to the length of the frame, which is the same as in FIGS. 7a, 7b, 8a, and 8c.

Figure 8B:
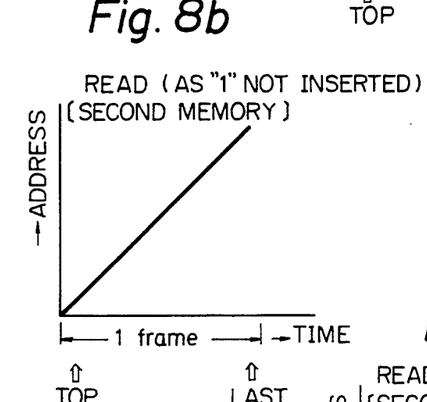

When the next frame of the generator 11 is input to the detector through the point 122 of the selector 11, the selectors 18 and 19 are switched opposite points 182 and 191 respectively, by the frame synchronizing signal "F" as shown in FIG. 6b. At the same time, the selectors 151 and 152 are switched to opposite sides shown by dotted lines. Therefore, all data of the frame written in the buffer memory 141 is read out as shown in FIG. 8b, and is input to the multiplexer 16. At the same time, all data of the next frame, that is to say, the second frame is written in the buffer memory 142 as shown in FIG. 8a. The frame is then read out of the buffer memory 141 and the first frame is output from the multiplexer 16, through the selectors 161 and 162.

The first frame has no sequential zeroes, and thus the datum "1" is not inserted in the first frame by the selector 161, and the flag bit C "0" is multiplexed by the selector 162, as shown in the upper view of FIG. 6b. When the selector 156 detects sequential zeroes in the second frame, the second frame is written in the first memory 13 as well as in the buffer memory 142. The writing operation of the second frame in the first memory 13 is carried out by the write and read addresses generator 153, as shown in FIGS. 7a and 7b. That is to say, the portion Y of FIG. 7a, corresponding to the portion X of FIG. 3b, which is forced out if the datum "1" is inserted by the selector 161 per 8 bits in the second frame, is written in the first memory, according to write the addresses generated by the generator 153. This portion Y is read out from the first memory 13 and is positioned at the top of the next or third frame. The selector 12 has been already switched to the point 121, by the signal sent from the detector 156. Also, after the second frame is written in the buffer memory 142, the selectors 18 and 19 have been already switched again as shown by the solid line of FIG. 6a. Therefore, the above portion Y is input to the buffer memory 141, and will be used as the valid data of the third frame.

Figure 8C:
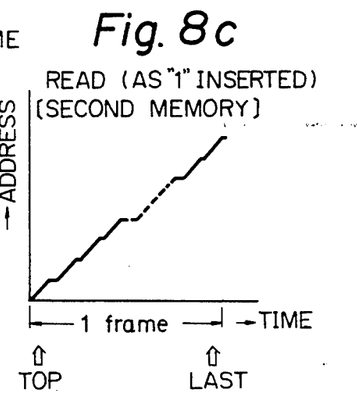

On the other hand, the second frame already written in the buffer memory 142 is read out from this memory 142, according to read addresses sent from the read address generator 155. In this case, as shown in FIG. 8c, the read address is not sent from the generator 155 to the buffer memory 142 through the selector 151, when the data being read is ready to have the datum "1" inserted by the selector 161. Therefore, the sequential zeroes data of 8 bits is read out from the buffer memory 142, at intervals of 1 bit. This sequential zeroes data is input to the selector 161 through the point 192 of the selector 19. The selector 161 adds the datum first to the 1 bit after the sequential zeroes 8 bits, and the selector 162 multiplexes the flag bit F of "1", as shown in the lower view of FIG. 6b.

Figure 9:
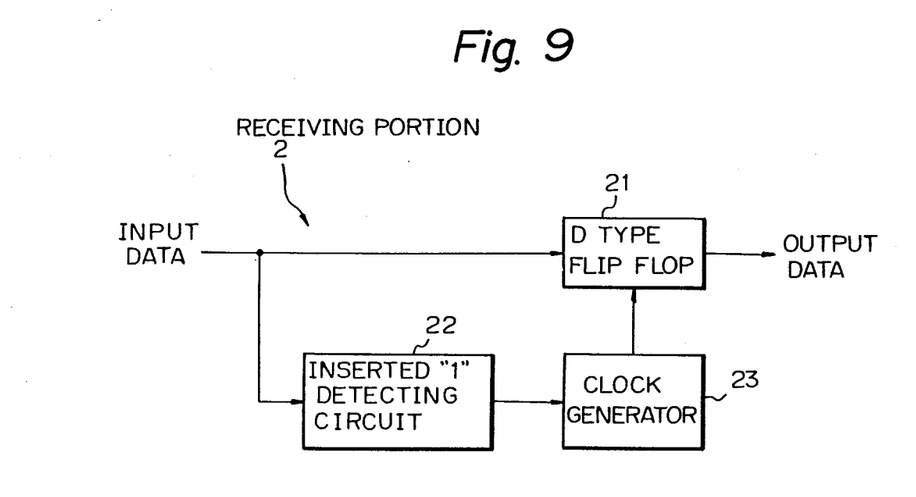
FIG. 9 is a circuit diagram of the receiving portion of the present invention.

The second frame where the datum "1" is inserted per 8 bits, is transmitted to the receiving portion 2 shown in FIG. 9. The receiving portion 2 of FIG. 9 consists of a D type flip flop 21, an inserted "1" detecting circuit 22, and a clock generator 23. The D type flip flop 21 stores available data (not including the inserted "1") sent from the transmitting portion 1 (see FIGS. 4 and 6a). The inserted "1" detecting circuit 22 detects whether the datum "1" is inserted in the frame sent from the transmitting portion 1, in other words, whether the flag bit C of this received frame is "1". The clock generator 23 generates clock pulses for reading data of the frame stored in the flip flop 21. When the datum "1" is not inserted in the received frame, the clock generator 23 generates clock pulses at the appropriate of all the data in the received frame, and therefore, the flip flop 21 outputs data according to these clock pulses, as shown in FIG. 10a.

Figure 10A:
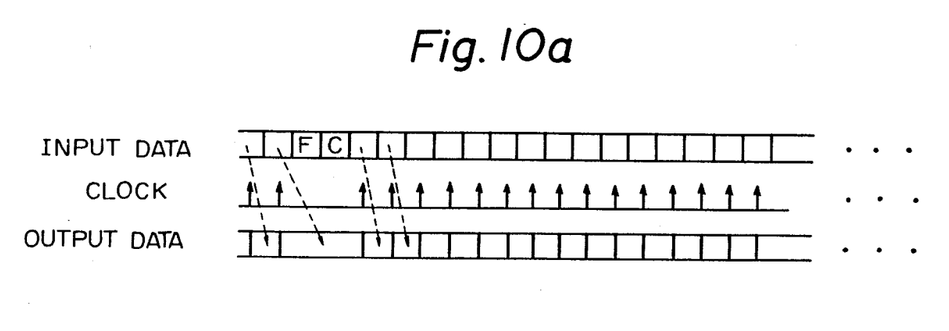
FIGS. 10a and 10b are explanatory views of the operation of FIG. 9.
Figure 10B:
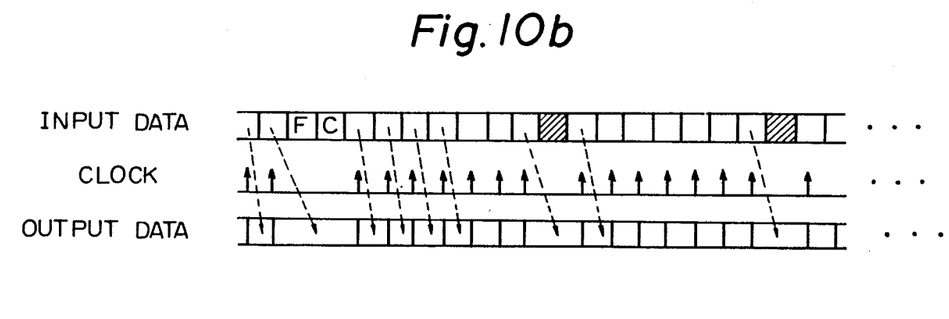

In contrast, when the datum "1" is inserted in the received frame, the clock generator 23 does not generate clock pulses when the datum "1" is inserted, as shown by the inclined lines of FIG. 10b. The flip flop 21 outputs only available data, according to clock pulses generated at the timing of the zeroes data except for the datum "1".

Figure 11:
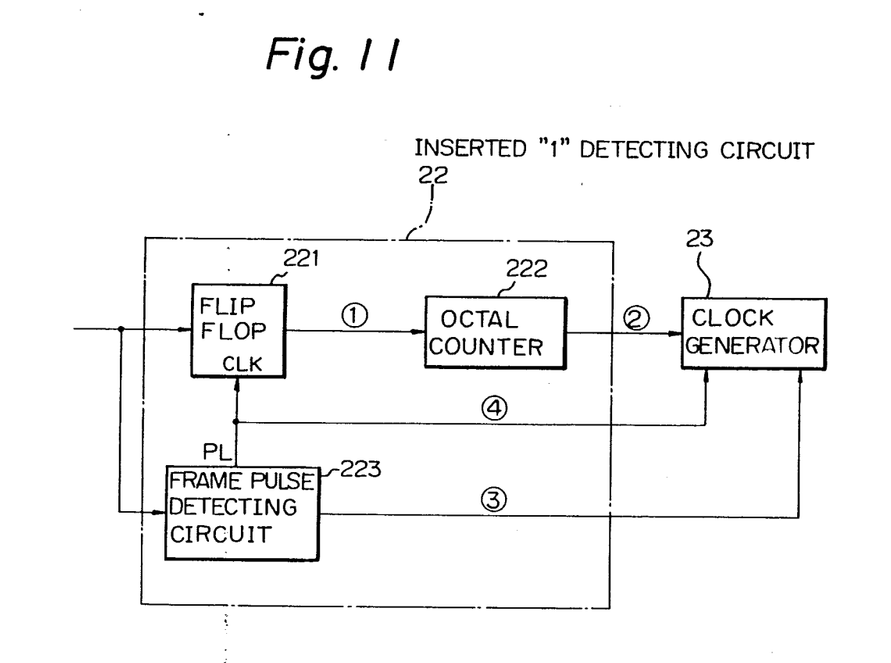
FIG. 11 is a more detailed circuit diagram of FIG. 9.

FIG. 11 shows details of the inserted "1" detecting circuit 22 of FIG. 9, which circuit 22 consists of a flip flop 221, octal counter 222, and frame pulse detecting circuit 223. When the circuit 223 detects a frame pulse on the base of the frame synchronizing bit F in the data of the received frame, the circuit 223 inputs a pulse PL to the terminal CLK of the flip flop 221 at the timing of the frame next to the frame pulse, and thus the data of the received frame is latched by the flip flop 221. When the datum "1" is inserted in the received, latched frame as shown by the inclined lines of FIG. 10b, the output signal of the flip flop 221 becomes "H" level (see ①), and this "H" level is input to the octal counter 222, whereby the octal counter 222 begins to count. When the octal counter 222 has counted 8 numbers, it outputs a carry signal to stop the clock generator 23 (see ②). Therefore, the only sequential zero data of 8 bits except for the datum "1" is output from the D type flip flop 21 of FIG. 9, as shown in FIG. 10b. Accordingly, when the frame synchronizing bit F and "1" inserting flag bit C are detected, the clock generator 23 is stopped by the corresponding signals ③ and ④, both from the frame pulse detecting circuit 223. The result is that only sequential zeros data is output from the D type flip flop 21, as shown by the dotted arrows of FIG. 10b.

As apparent from FIG. 10a, when the datum "1" is not inserted in the frame received by the D type flip flop 21, the clock generator 23 is stopped by only the signals ③ and ④ of the frame pulse detecting circuit 223. Thus, all data except for the bits F and C is output from the flip flop 21, as shown by the dotted arrows of FIG. 10a.

I claim:
1. A method for suppressing sequential "zeroes" data comprising the steps of:
   detecting whether zeroes are sequenced in a frame;
   inserting a datum "1" into the frame after detecting said sequential zeroes and forcing out a portion of said frame;
   sending the frame having said inserted datum "1";
   adding the forced out portion of said frame to a beginning of a next frame; and
   detecting using said forced out portion of said frame whether said datum "1" has been inserted because said sequential zeroes data are present in the frame received, and removing said datum "1" from said received frame.
2. A circuit for suppressing sequential "zeroes" data comprising:
   a transmitting portion comprising:
     data generator means for generating a data frame;
     a selector connected to said data generator means;
     a first memory connected to said selector;
     a second memory connected to said selector;

a multiplexer connected to said second memory; and a sequential zeroes detecting circuit connected between said selector and said multiplexer and inputting the frame through said selector from the data generator means, and when said sequential zeroes detecting circuit detects sequential zeroes in said frame said sequential zeroes detecting circuit reading out said frame from said second memory and causing said multiplexer to insert a datum "1" in said frame and forcing out a portion of said frame, and reading out the forced out portion of said frame from said first memory and switching said selector from said data generator toward said first memory;

said selector adding said forced out portion of said frame in front of a next frame through said selector; and a receiving portion connected to said transmitting portion and comprising:
 a clock generator sending clock pulses;
 a flip flop connected to said clock generator and receiving the clock pulses; and
 an inserted "1" detecting circuit detecting said datum "1" in a frame sent from said transmitting portion, and preventing said clock generator from sending clock pulses to said flip flop, whereby said datum "1" is preventing output of said datum "1" from said frame received in said flip flop.

3. A circuit for suppressing sequential "zeroes" data according to claim 2,
 said second memory of said transmitting portion comprising two buffer memories connected to the sequential zeroes detecting circuit and which write and read alternatively, and
 said inserted "1" detecting circuit of said receiving portion comprising a counter connected to and stopping said clock generator when detecting said datum "1" in said frame sent from said transmitting portion.

4. A communication system that suppresses sequential bits, comprising:
 a transmitter, comprising:
  first detection means for detecting a predetermined number of sequential first bits; and
  adding means for inserting a second bit between the predetermined number of sequential first bits and following data bits in dependence on the detection by said first detection means, said adding means comprising:
   memory means for storing the predetermined number of sequential first bits and the following data bits; and
   a multiplexer connected to said memory means and inserting the second bit between the predetermined number of sequential first bits and the following data bits; and
 a receiver coupled to said transmitter, comprising:
  second detection means for detecting the predetermined number of sequential first bits; and
  deletion means for removing the second bit following the predetermined number of sequential first bits in dependence on the detection by said second detection means.

5. The communication system of claim 4,
 said adding means further comprising a selector connected to said first detection means and passing the predetermined number of sequential first bits and the following data bits, and
 said memory means comprising:
  a first memory connected to said selector and said first detection means; and
  a second memory connected to said first detection means and between said selector and said multiplexer.

6. The communication system of claim 5, said second memory comprising two buffers connected to said first detection means, said two buffers alternatively reading and writing.

7. The communication system of claim 6, said deletion means compising:
 a flip flop passing the predetermined number of sequential first bits and the following bits; and
 a clock connected to said second detection means and clocking said flip flop in dependence on the detection by said second detection means.

* * * * *